United States Patent [19]

Tuskos

[11] 4,090,898
[45] May 23, 1978

[54] METHODS AND APPARATUS FOR SPIN WELDING THERMOPLASTIC WORKPIECES

[75] Inventor: Michael E. Tuskos, Louisville, Ky.

[73] Assignee: Celanese Corporation, New York, N.Y.

[21] Appl. No.: 773,481

[22] Filed: Mar. 2, 1977

[51] Int. Cl.² .......................................... B32B 31/20
[52] U.S. Cl. ................................ 156/73.5; 156/366; 156/368; 156/580; 228/2; 228/112; 264/68
[58] Field of Search ................... 228/2, 112; 156/73.5, 156/368, 580, 581, 582, 366; 264/68

[56] References Cited

U.S. PATENT DOCUMENTS

| | | | |
|---|---|---|---|
| 3,606,968 | 9/1971 | Loyd | 228/112 |
| 3,613,982 | 10/1971 | Hollenberg | 228/112 |
| 3,897,896 | 8/1975 | Louw et al. | 228/2 |

Primary Examiner—Edward G. Whitby

[57] ABSTRACT

A pair of thermoplastic workpieces are spin welded by placing one element in a non-rotatable, reciprocable clamp. Another workpiece is press-fit onto the first workpiece and the clamp is shifted toward a continuously rotatable collet having radially inwardly closable jaws. A mandrel extends from the collet and projects beyond the jaws to guide the workpieces between the jaws. The mandrel is axially inwardly displaceable by the workpieces, with inward movement thereof being yieldably resisted by a spring to insure that radial shoulders on the workpieces are in abutment. When the other workpiece is positioned between the jaws, the jaws are closed radially into driving contact with such workpiece to substantially instantly rotate the latter at the speed of the collet relative to the one workpiece. Frictional heat thus generated melts the interface between the workpieces. When the other workpiece is released from the jaws, it adheres to the one workpiece.

30 Claims, 11 Drawing Figures

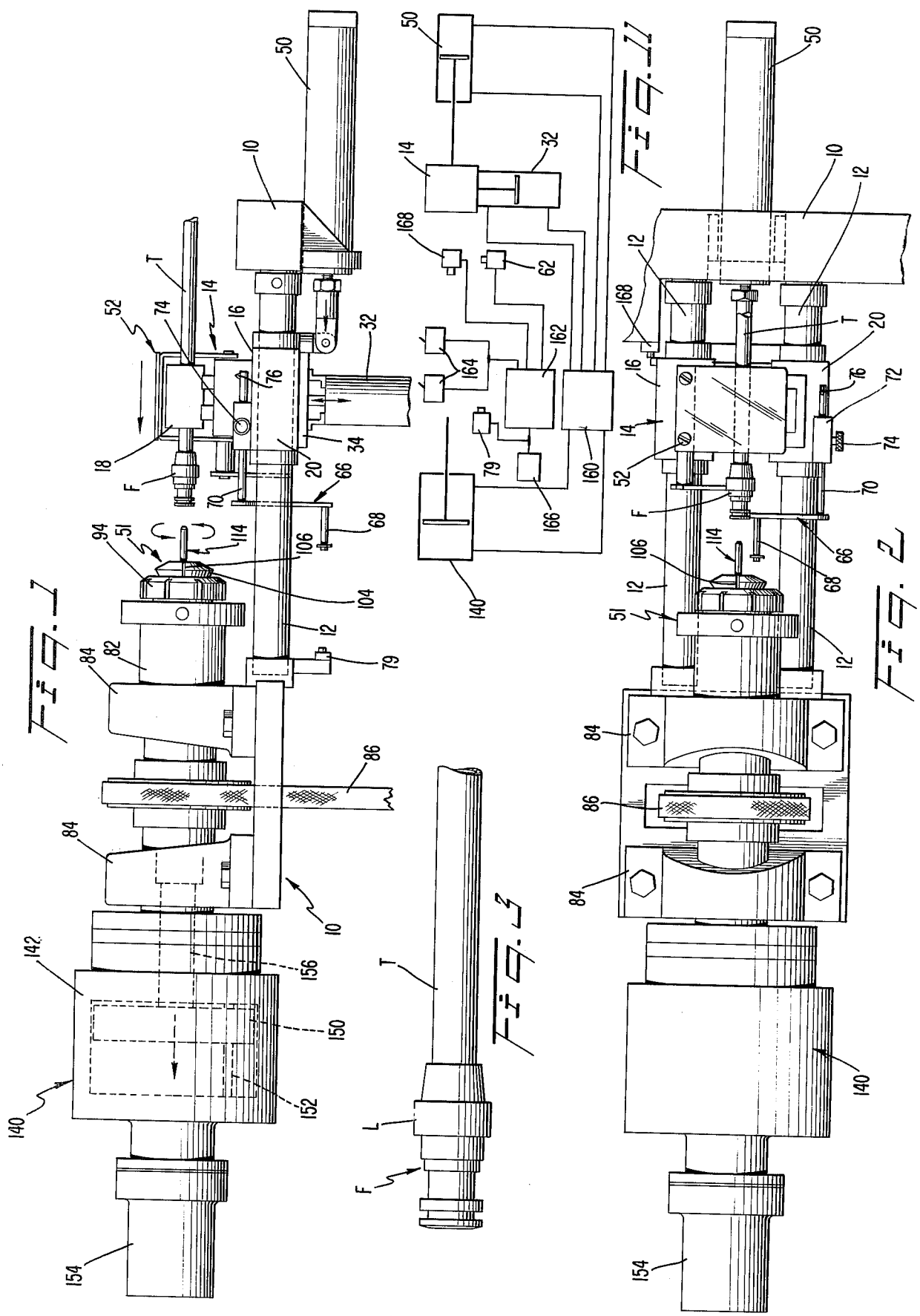

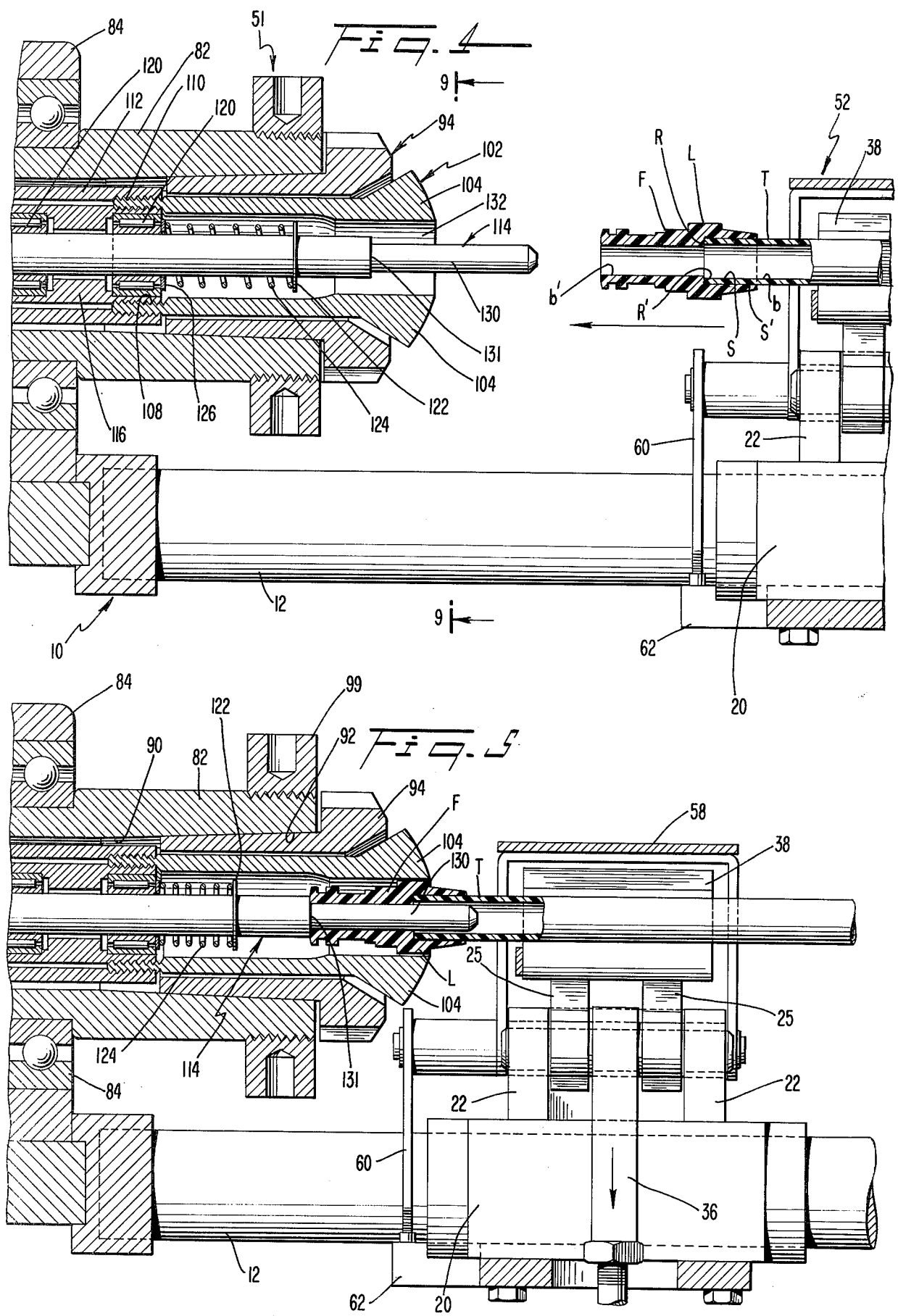

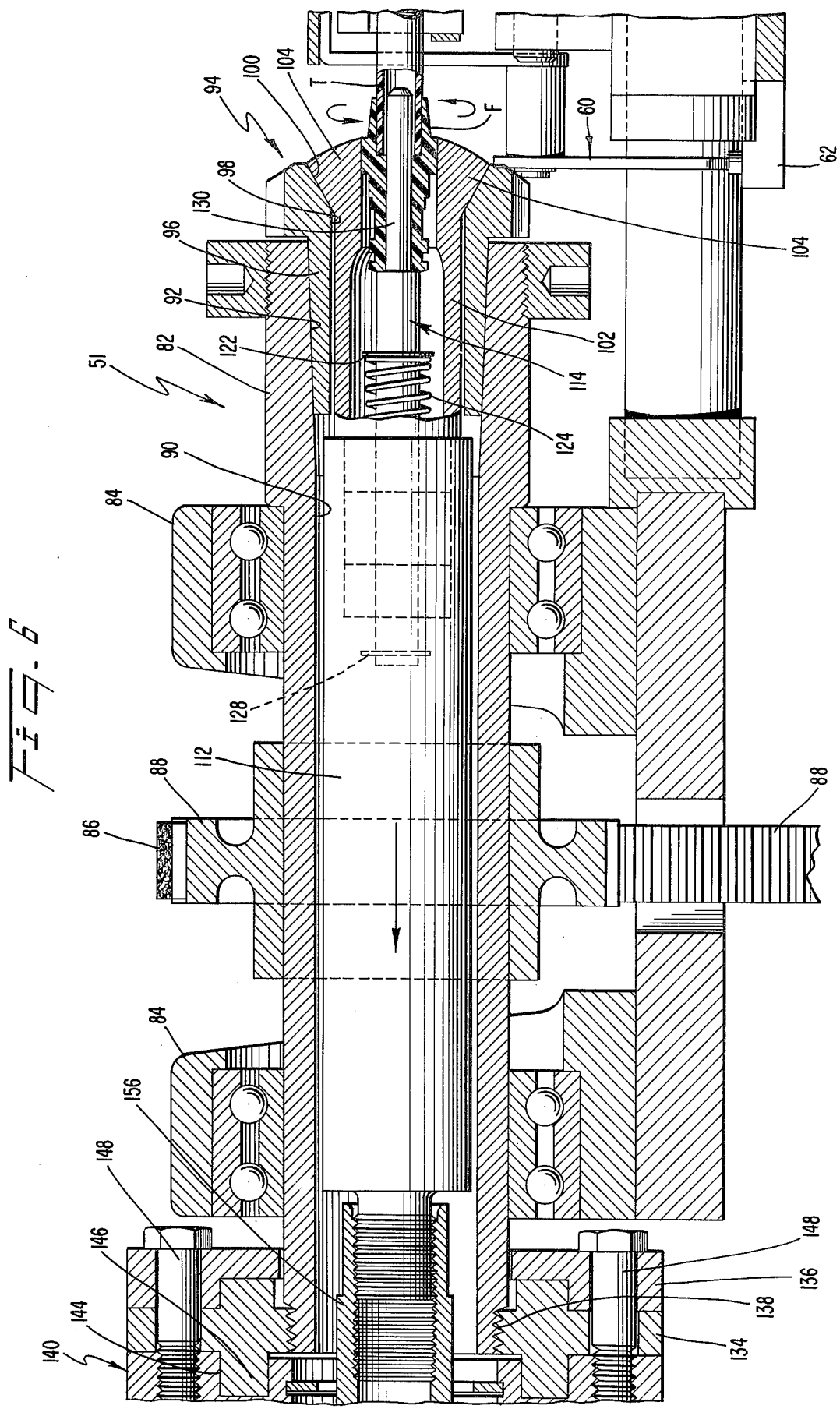

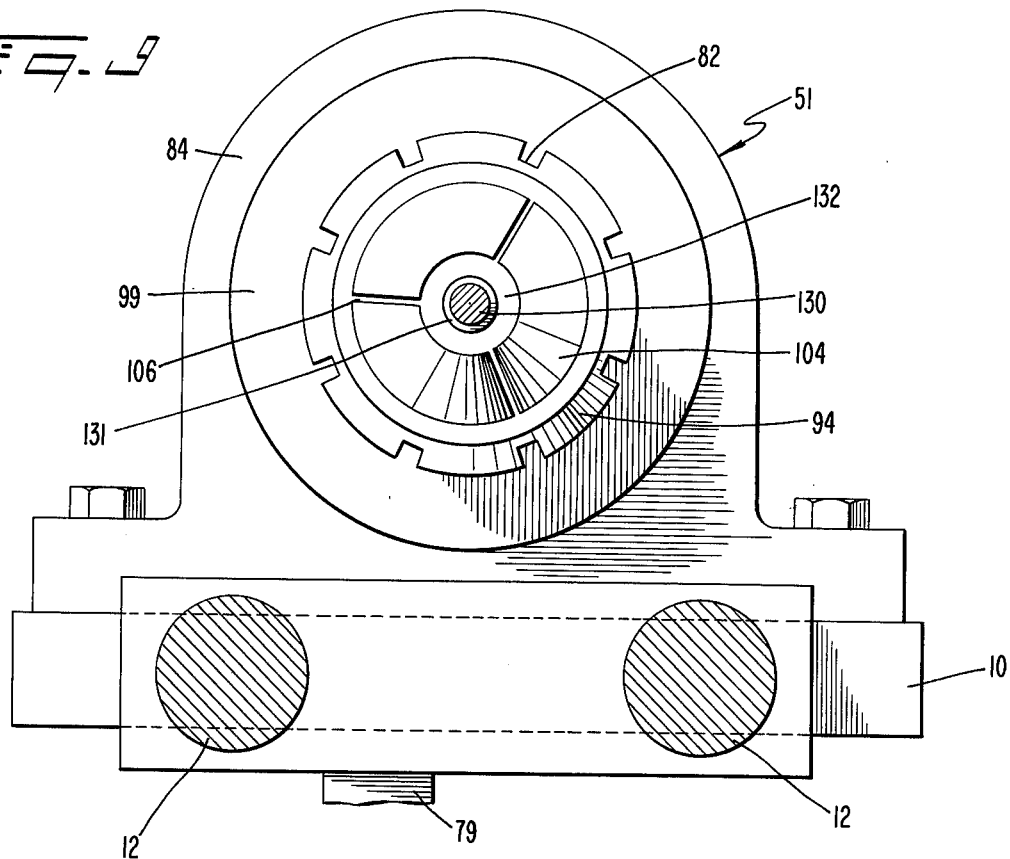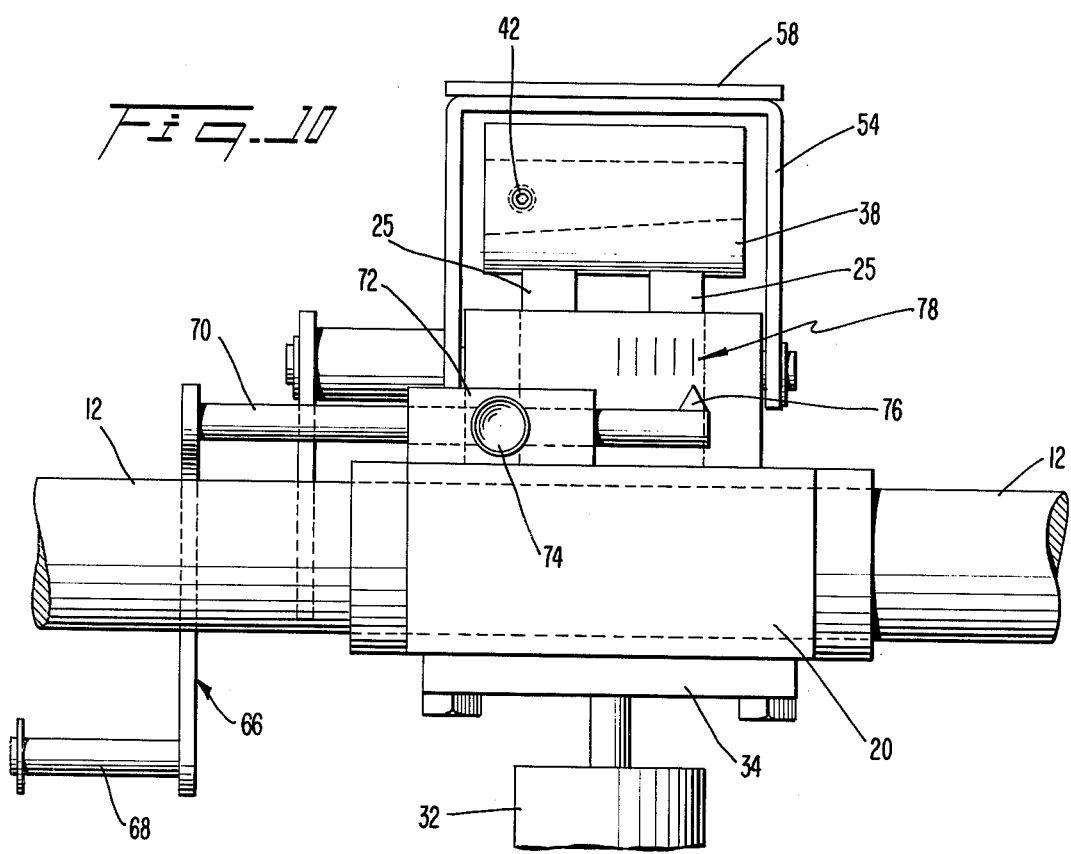

METHODS AND APPARATUS FOR SPIN WELDING THERMOPLASTIC WORKPIECES

BACKGROUND AND OBJECTS

This invention relates to spin welding methods and apparatus for bonding thermoplastic elements together.

Spin welding is a technique which has heretofore been employed to bond together thermoplastic elements. Various equipment and operations for spin welding have been heretofore proposed, as exemplified by the following U.S. Pat. Nos.: 2,933,428 issued to Mueller on Apr. 19, 1960; 3,078,912 issued to Hitzelberger on Feb. 26, 1963; 3,344,010 issued to Franz on Sept. 26, 1967; and 3,993,519 issued to Birkhold on Nov. 23, 1976.

Spin welding is effected by establishing a relative rubbing action between the plastic workpieces to generate frictional heat which melts the interface between the workpieces. When this melt subsequently hardens, the workpieces adhere together at the interface.

Relative rubbing movement can be effected by placing the workpieces into separate fixtures, rotating one of the fixtures, and bringing the workpieces into contact. When sufficient melting has occurred, the driven workpiece is braked. This technique is not highly efficient, due to the time and energy expended in repeatedly starting and stopping the driving fixture.

Alternatively, a continuously rotating drive fixture can be employed which is brought into axial contact with a driven workpiece that is mounted on a stationary workpiece. Consequently, full acceleration of the driven workpiece occurs rapidly. When sufficient melt has occurred, the driven workpiece is released from the drive fixture and comes to a stop upon adhering to the stationary workpiece. Thus, there is no need for repeatedly starting and stopping the drive fixture.

The latter technique does, however, present a problem involving the manner of establishing a driving relationship between the drive fixture and the driven workpiece. It has been suggested, for instance, that teeth or fingers on the drive fixture axially contact the driven workpiece or enter openings in the driven workpiece. One disadvantage of this technique is that precise control over the spin welding operation is difficult to attain. That is, the driven workpiece will tend to rotate when first contacted by the drive fixture. However, as the drive fixture presses the driven workpiece axially against the stationary workpiece, frictional resistance to rotation will intensify. Consequently, there is a tendency for some slippage and uneven acceleration of the driven workpiece to occur during start-up. These same effects function in reverse to cause slippage during release of the driven workpiece. Consequently, the time required to fully accelerate and decellerate the driven workpiece, and hence the time for effecting a weld, can vary from one operation to the next. This variance can be significant, since high-speed spin welding of plastic workpieces can be achieved in a spin period of less than a second, and since inexact periods of rotation tend to create inadequate bonds. That is, insufficient rotation will produce too little melting at the interface, while too much rotation produces excessive melt which tends to flow from the interface.

Other problems associated with the reliance upon axial drive contact between the drive fixture and driven workpiece include the danger that during slippage in the drive contact, the driven workpiece can be damaged by teeth on the drive fixture, or that undesired melting can occur where the drive fixture contacts the driven workpiece.

Therefore, it is an object of the present invention to eliminate or minimize problems of the sort discussed above.

It is another object of the invention to provide novel spin welding methods and apparatus.

It is a further object of the invention to provide novel spin welding methods and apparatus in which the spin period is precisely controlled.

It is yet another object of the invention to provide novel spin welding methods and apparatus which effectively utilize a continuously rotating drive member.

It is a further object of the invention to provide novel spin welding methods and apparatus which minimize the risk of damage or inadvertent melting of the workpiece.

It is an additional object of the invention to provide novel spin welding methods and apparatus for bonding a thermoplastic tube to a thermoplastic fitting so that a longitudinal and radial interface therebetween is bonded together.

It is still a further object of the invention to provide novel spin welding methods and apparatus in which a driven workpiece is radially gripped by a continuously rotating collet.

BRIEF SUMMARY OF INVENTION

These and other objects and advantages are achieved by the present invention in which a gripping member with radially closable jaws is continuously rotated. These jaws are closed radially into contact with a first thermoplastic workpiece which is mounted upon a second workpiece. The second workpiece spins relative to the first workpiece to melt the interface and is then released from the jaws.

A mandrel projects from the jaws and is loosely received within a bore of the first workpiece to guide the workpieces between the jaws. The mandrel, upon being contacted by the workpieces, is axially movable against a yieldable force to insure that radial shoulders on the workpieces are in contact. The jaws rotate relative to the mandrel so that the mandrel does not generate welding friction within the bore.

THE DRAWING

A preferred embodiment of the present invention is set forth in the subsequent detailed description in connection with the accompanying drawings in which like numerals designate like elements and in which:

FIG. 1 is a side elevational view of a preferred form of spin welding machine according to the present invention;

FIG. 2 is a plan view of the machine depicted in FIG. 1;

FIG. 3 is a view of one form of thermoplastic workpieces that can be welded according to the present invention;

FIG. 4 is a longitudinal sectional view taken along a vertical plane, depicting clamp and collet portions of the spin welding machine in an initial stage of a spin welding procedure;

FIG. 5 is a view similar to FIG. 4 in a subsequent stage of the spin welding procedure;

FIG. 6 is a longitudinal sectional view through a spinner assembly portion of the spin welding machine.

FIG. 9 is a front view of a spinner assembly of the spin welding machine;

FIG. 10 is a side view of a reciprocable carriage member of the spin welding machine; and FIG. 11 is a schematic view of an automatic control system for the spin welding machine.

DETAILED DESCRIPTION OF A PREFERRED EMBODIMENT OF THE INVENTION

A spin welding machine according to the present invention comprises a fixed framework 10 which includes a pair of horizontally parallel, longitudinally extending cylindrical guide rails 12.

Figure 7:
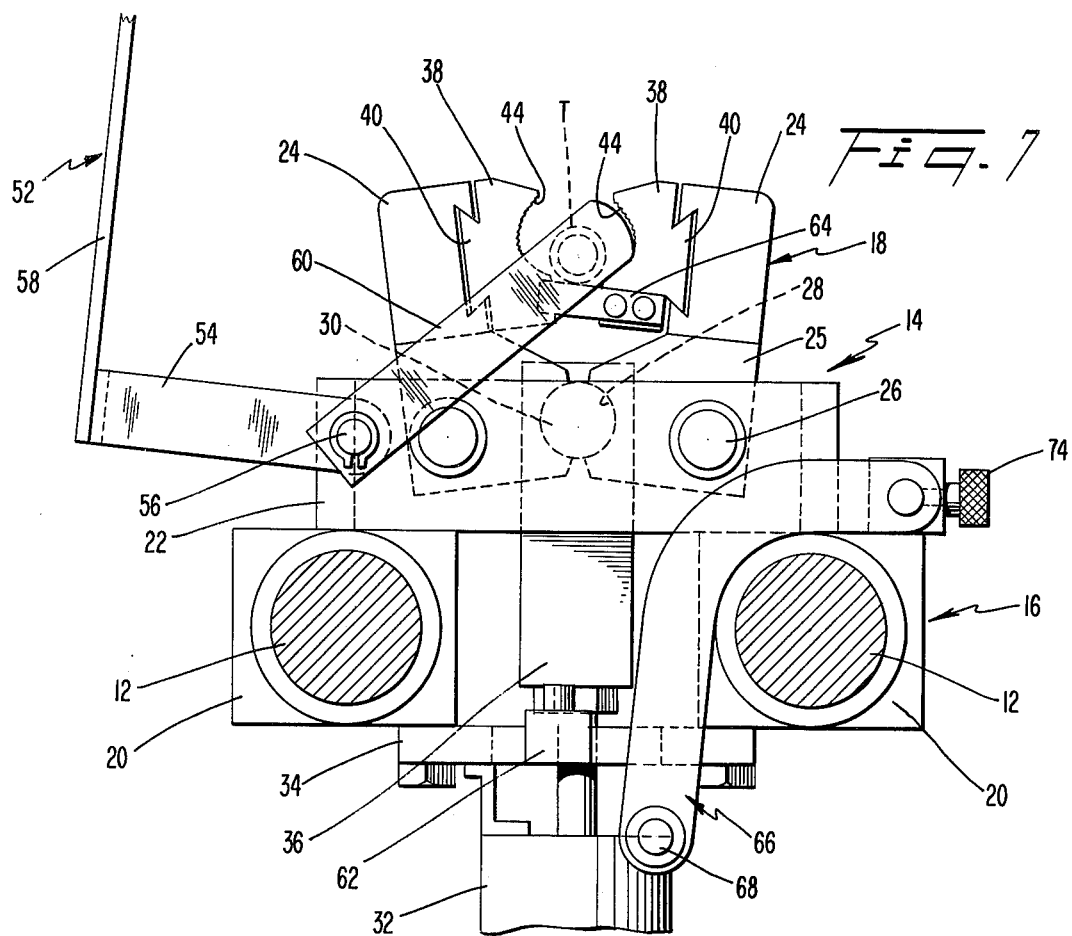
FIG. 7 is a front view of a clamp portion of the spin welding machine, when the clamp is open.
Figure 8:
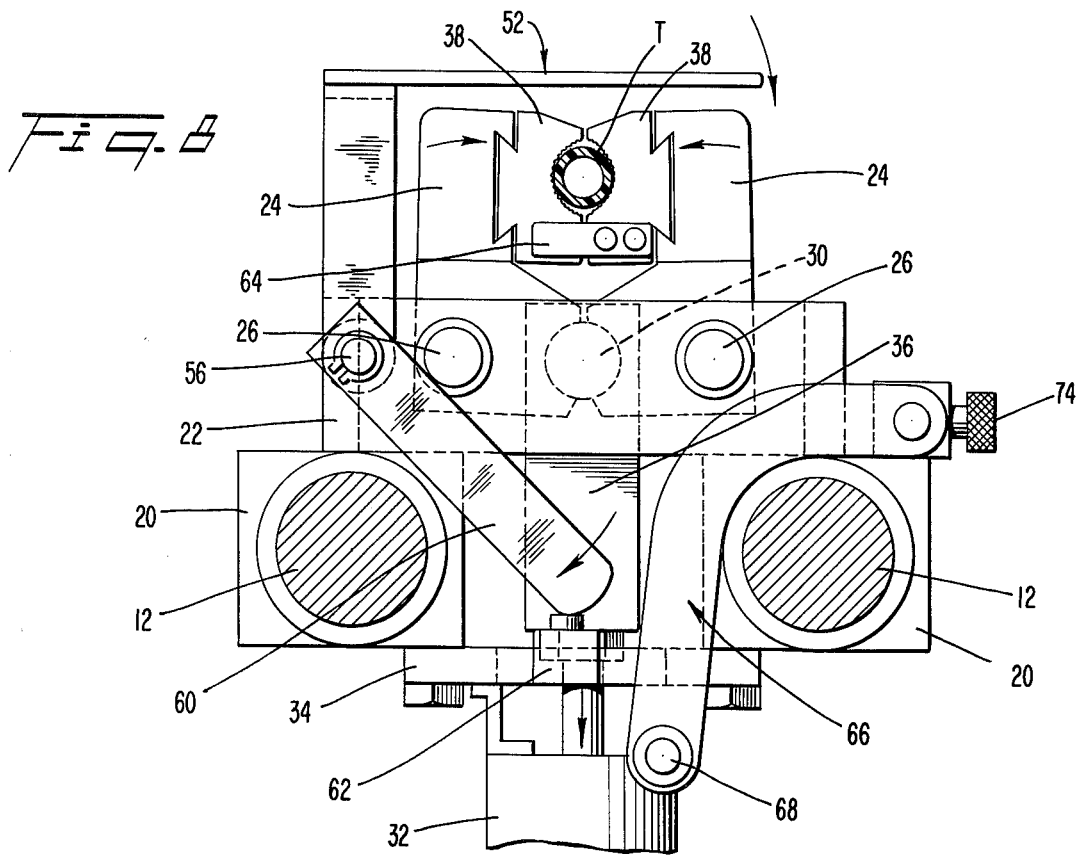
FIG. 8 is a view similar to FIG. 7 when the clamp is closed.

Slidably mounted for reciprocable movement on the guide rails 12 is a carriage 14. The carriage 14 includes a support section 16 carrying a clamping fixture 18 (FIGS. 1, 7 and 8). The support portion 16 comprises a pair of apertured blocks 20 which are slidably mounted on the guide rails 12. Extending across the tops of the blocks 20 are a pair of upstanding bridge members 22.

The clamping fixture comprises a pair of clamp holders 24 pivotably mounted to the bridge members 22. The clamp holders each include a pair of legs 25 pivotably mounted via pivot pin 26 to the bridge member 22. The legs 25 also include generally semicircular recesses 28 (FIG. 7) which cooperate to form aligned, generally circular passages. Received in these aligned passages is a pin 30 which forms part of a clamp-activating mechanism. The clamp-activating mechanism comprises a pneumatic ram or cylinder 32 which is affixed to the blocks 20 of the carriage by means of a mounting plate 34. The rod end of the ram 32 is connected to a rigid connector element 36 which carries the pin 30. Extension and retraction of this clamp control ram 32 produces reciprocation of the pin 30 to swing the clamp holders 24 about the pivot pins 26.

The clamp holders 24 each carry a removable clamp element 38 (FIGS. 7, 8, and 10). Each clamp element 38 comprises a tapered dove-tail projection 40 which is slidably received within a tapered dove-tail slot of its associated holder 24. Releasable set screws 42 function to releasably fix the clamp elements 38 within the holders 24. The clamp elements 38 include serrated clamping recesses 44 which are configured to grip a thermoplastic workpiece.

Secured to the framework 10 behind the carriage 14 is a pneumatic ram 50, the rod end of which is connected to the rear end of the carriage. This carriage control ram 50 produces reciprocation of the carriage along the guide rails 12 toward and away from a spinner assembly 51.

Rotatably mounted on the bridge members 22 is a manually rotatable control arm 52 (FIGS. 1, 7 and 8). This control arm 52 includes a pair of mounting legs 54 which are pivotably mounted to the bridge members 22 for swinging movement about an axis 56 extending parallel to the direction of movement of the carriage 14. A handle 58, in the form of a plate, is rigidly secured to the top of the legs 54. Rigidly secured at the bottom of a forwardmost one of the legs 54 is an actuating lever 60. In the path of movement of this lever 60 there is situated a first limit switch 62 which is suitably connected for energizing the clamp control ram 32.

By raising and lowering the handle 58, the lever 60 can be correspondingly raised and lowered. When the handle is in its raised position, access is afforded to the clamp to permit insertion therein of a plastic workpiece. When the handle 58 is subsequently rotated to a horizontal position, the lever 60 actuates the first limit switch 62 which energizes the clamp control ram 32 to retract the latter. This rotates the clamp holders 24 to close the clamp elements 38 tightly about the workpiece.

A plate 64 can be secured to one of the clamp holders 38 to extend across and below the recesses 44 to underlie the workpiece.

Mounted on the carriage 14 is an adjustable abutment arm 66. The abutment arm 66 includes a forwardly projecting switch-actuating extension 68 and a rear mounting portion 70 (FIGS. 1 and 10). The mounting portion 70 is slidably mounted in an apertured block 72 carried by the carriage 14. A set screw 74 is provided to enable the abutment arm 66 to be set at various places of adjustment. A pointer 76 provided at the rear end of the abutment arm 66 cooperates with a fixed scale 78 on the carriage to indicate the relative location of the switch-actuating extension 68. The extension 68 of the arm 66 serves to actuate a limit switch 79 mounted on the framework 10 as will be explained later in more detail.

Situated in front of the carriage 14 is a spinner assembly 51 which functions to rotate a driven thermoplastic workpiece relative to the stationary workpiece which is clamped in the clamp 18.

The workpieces can comprise thermoplastic elements of different shapes and sizes. However, the present invention is particularly effective in spin welding a thermoplastic tube or conduit T to a thermoplastic fitting F suitable for carrying a snap fit connector for securing the tube to a fluid conductor, for example, as described in a commonly assigned application Ser. No. 763,588 filed Jan. 28, 1977 by W. J. Frey and P. L. Meyer. The tube T and fitting F have aligned bores $b$, $b^1$ extending therethrough, with a bore $b^1$ of the fitting including a socket portion S in which the tube T is to be welded. The fitting F includes an annular flange L.

The spinner assembly 51 includes a spindle 82 which is rotatably carried by a pair of pillow block bearings 84 mounted on the framework 10. The axis of rotation of the spindle is generally aligned with the direction of reciprocable movement of the clamp 18. The spindle 82 is drivingly connected to a motor (not shown) by means of a suitable belt-pulley arrangement 86, 88. The belt 86 preferably includes internal teeth 88 which mesh with a toothed drive gear fixed on the motor shaft and with the toothed driven pulley 88 fixed on the spindle 82, so as to prevent slippage in the drive train.

The spindle 82 has a bore 90 running longitudinally therethrough. The front end 92 of the bore is frusto-conically shaped.

Positioned loosely in the front end 92 of the bore 90 is a head 94 which has a generally frusto-conical rear portion 96 and a bore 98 extending longitudinally therethrough, which bore is frusto-conical at its front end 100.

A threaded nut 99 is secured around the forward end of the spindle 82.

Disposed within the bores 90, 98 of the spindle 82 and the head 94 is a collet 102. The collet 102 includes jaw portions 104 at its forward end which are separated by longitudinal slits 106 (FIG. 1) so as to be radially flexible. The rear end of the collet includes internal and external threads 108, 110 (FIGS. 4 and 5). A collet extension 112 is threadedly connected to the external threads 110, and a mandrel assembly is threadedly connected to the internal threads 108.

The mandrel assembly includes a spool 116 and a mandrel 114 slidably carried by the spool (FIGS. 4 and 5). The spool 116 has external threads which are connected to the internal threads 108 of the collet 102. The mandrel 114 is rotatably carried by a pair of axially-spaced bearings 120 in the spool. A flange plate 122 is mounted on the mandrel 114 and a coil compression spring 124 is operably disposed between the flange 122 and a plate 126 at the front of the spool 116 to bias the mandrel axially outwardly. A stop plate 128 is attached to the mandrel 114 rearwardly of the spool 116 to limit forward extension of the mandrel 114 (FIG. 6). If desired, axial thrust bearings (not shown) can be provided at front end and rear ends of the spool 116 to engage the plates 126 and 128.

The outer portion 130 of the mandrel 114 is of reduced diameter and extends coaxially with the collet 102 through and beyond a recess 132 formed by the jaws 104 of the collet 102. This outer portion 130 results in the formation of a radial lip 131 on the mandrel 114.

At the rear end of the spindle 82 a pair of adapter plates 134, 136 are mounted. An outermost one 134 of the plates is threadedly connected to external threads 138 of the spindle 82.

Mounted on the plates 134, 136 is a power unit 140. This power unit 140 comprises a pneumatically driven fluid ram which is connected for rotation with the spindle and is operable to reciprocate the collet 102. Such a unit is conventional and is available from the S-P Mfg. Co. of Cleveland, Ohio, and identifiable as a 4½ RM Aluminum Rotating Air Cylinder and does not, per se, constitute a novel feature of the present invention.

The power unit 140 will be briefly described as comprising a housing 142 that includes an annular recess 144 which receives an annular boss 146 on the outer adapter plate 134 (FIG. 6). Connection between the housing 142 and the plates 134, 136 is effected by a series of bolts 148. A piston 150 is carried within the housing 142 and is guided reciprocably by means of one or more guide pins 152 fixed within the housing 142. Pressurized air is supplied to opposite sides of the piston via air passages (not shown) extending through a rear portion 154 of the housing 142. By delivering pressurized air to opposite sides of the piston 150, the piston can be reciprocated. It will be realized, that the housing 142 and the piston 150 are rotated by the spindle 82. The piston 150 has a forwardly extending arm 156 (FIG. 6) which is threadedly connected to external threads at the back end of the collet extension 112. Therefore, the collet 102 rotates with the piston 150 and reciprocates in response to reciprocation of the piston 150.

The tubular workpiece T can be placed into the clamp by hand and the fitting F can thereafter be placed onto the tubular workpiece. These steps could, if desired, be effected by an automatically operating mechanism. After the plastic tube T and fitting F have been installed in the clamp 18, the welding steps can be performed automatically in any desired fashion by means readily apparent to one skilled in the art.

One suitable control system is depicted schematically in FIG. 11 and comprises a valve mechanism 160 which is arranged to direct pressurized air to selected ones of the clamp control ram 32, the carriage control ram 50, and the collet control unit 140. A master control panel 162 is connected to the valve mechanism 160 for actuating the latter to energize and de-energize appropriate ones of these power elements 32, 50, 140 in response to actuation of a plurality of manual and automatic limit switches which are connected to the control panel 162. Such switches include the previously-described limit switch 62 which is carried by the carriage 14. When this switch 62 is actuated by the lever 60 of the control arm 52, it causes the valve mechanism 160 to retract the clamp control ram 32 to close the clamp elements 38 around the plastic tube T.

A pair of manually actuable switches 164 are mounted on the framework 10. When these switches 164 are simultaneously activated by an operator, the carriage control ram 50 is extended to push the carriage 14 forward the spinner assembly 51.

The limit switch 79 mounted beneath the spindle 82 is actuated by the extension 68 of the abutment arm 66 to cause the carriage control ram 50 to be de-energized and cause the collet control unit 140 to retract the collet 102 for gripping the driven workpiece. Actuation of the limit switch 79 also causes a timer mechanism 166 to be activated. At the end of a predetermined time period, the timer mechanism 166 causes the collet control unit 140 to extend the collet 102 for releasing the driven workpiece, and causes the carriage control ram 50 to retract the carriage 14 from the spinner assembly 51. A limit switch 168 is mounted on the framework 10 adjacent the retracted or rest position of the carriage 14. When the carriage has returned to its rest position (FIG. 1), the limit switch 168 is actuated to de-energize the carriage control ram 50 and extend the clamp control ram 32 to open the clamp.

The operating cycle of the spin welding machine begins with the carriage 14 disposed in its rest position (FIGS. 1, 2, and 7) wherein the clamp 18 is open and the control arm 52 is oriented so that the lever 60 thereof lies in front of the clamp recesses 44 (FIG. 7). A thermoplastic tube T is inserted into the clamp so that the front end of the tube engages the lever 60. The front end of the tube T is thereby spaced, a predetermined distance, relative to the rotating spinner assembly 51. The control arm 52 is then rotated so that the lever 60 actuates the limit switch 62 to retract the clamp control ram 32 and thereby close the clamp tightly around the tube T. A thermoplastic fitting F is thereafter inserted by friction fit onto the end of the tube (FIGS. 1 and 2). If desired, the fitting F could be placed onto the tube T before placing the tube into the clamp, with the lever 60 being relocated accordingly. Preferably, the inner end of the socket S of the fitting into which the tube is inserted engages the tube T with a relatively tight press-fit. The outer end $S^1$ of the socket is preferably flared outwardly to provide a reservoir for receiving melt, as will become apparent.

With the fitting F installed upon the tube T, the operator actuates the switches 164 together (simultaneous activation insures that both hands of the operator are out of the welding vicinity) to extend the carriage control ram 50 and thereby advance the carriage 14 toward the spinner assembly 51 (FIG. 4). During such advancement the tube T and fitting F approach the mandrel 114 with the bores $b$, $b^1$ aligned therewith. The bores $b$, $b^1$ receive loosely the outer portion 130 of the mandrel 114 as advancement continues, until the fitting F enters the recess 132 between the jaws 102, and the end of the fitting abuts the lip 131 of the mandrel 114.

Thereupon, the advancing motion of the carriage 14 is transmitted to the mandrel through the workpieces T, F and the mandrel is urged inwardly against the bias of the spring 124. The spring is sufficiently strong to assure that the tube T bottoms-out in the fitting F, i.e., the internal radial shoulders R, $R^1$ of the tube and fitting are in abutting relation, if such relation was not attained upon initial installation of the fitting onto the tube. Thereafter, the mandrel is depressed inwardly by the oncoming carriage 14 so that the annular flange L of the fitting F enters the recess 132. At this point, the extension 68 of the abutment arm 66 engages the microswitch 79, causing the carriage control ram 50 to be de-energized, and causing the collet control unit 140 to suddenly and rapidly retract the rotating collet 102 so that engagement of the jaws 104 with the wedge surface 100 of the head 94 flexes the jaws radially inwardly against the flange L (FIGS. 5 and 6). The flange F is thus radially gripped and suddenly rotated at the speed of the collet 102.

The annular flange L of the fitting F is of one-piece, relatively thick construction so that no compression forces are transmitted to the tube T. Since the tube T is fixed against rotation by the clamp 18, the fitting F spins relative to the tube, generating frictional heat which melts the interface between the workpieces, including the radial shoulders R, $R^1$.

During such spinning period the mandrel 114, which extends within the bores $b$, $b^1$ beyond the juncture of the shoulders R, $R^1$, prevents melt therefrom from blocking the bores.

Although the mandrel 114 is mounted to the collet 102 via the spool 116 and may tend to be rotated as a consequence, contact of the mandrel against the bores $b$, $b^1$ terminates such rotation, since the resulting frictional resistance of such contact overcomes the rotary drive forces at the bearings 120. Thus, by mounting the mandrel for rotation relative to the collet, there is no danger that the mandrel 114 will generate frictional heat within the workpieces which could melt and thus partially or totally block the bores $b$, $b^1$.

As the interface melts, there may be a tendency for such melt to travel axially from the socket S. This tendency is minimized by the enlargement $S^1$ of the socket which forms a reservoir to receive such melt.

After a preselected time interval the timer mechanism 166 causes the collet control unit 140 to extend the collet 102 whereupon the jaws 104 flex outwardly to release the fitting F, and causes the carriage control ram 50 to return the carriage to its rest position.

In one test operation of a machine embodying the principles of the present invention, the fitting F was radially gripped and instantly spun at about 4,000 RPM and then released and returned to the rest position, all in less than one second.

When the limit switch 168 is actuated by the carriage 14, the carriage control ram 50 is de-energized and the clamp control ram 32 is extended to open the clamp 18 to permit removal of the finished welded article (FIG. 3). As the clamp opens, the clamp holder 24 located adjacent the control arm 52 bumps against the legs 54 of the control arm to swing the latter to an open position (FIG. 7).

If it is desired to employ tubes of different diameter, the clamp elements 38 can be replaced by larger units. If the length of the fitting F is to vary, the abutment arm 66 can be adjusted to regulate the closing of the jaws 104 in accordance with the length of the fitting to assure that the fitting is properly situated within the recess 132 when the jaws close.

The spin welding methods and apparatus according to the present invention effectively utilize a continuously rotating drive member while maintaining maximum control of the spin period. The jaws 104 of the collet close rapidly in a radial direction against the fitting F, rather than in an axial direction, so that no appreciable slippage occurs during start-up of the spin, and the fitting accelerates virtually instantly to full speed. In similar fashion, the fitting is instantly released absent any appreciable slippage.

There are no axially projecting teeth on the drive collet of the type capable of damaging the fitting, or which require the provision of cooperating recesses in the fitting. The drive transmission between the collet and fitting is frictional and is established in a manner producing virtually no slippage or loss of control of the spin operation.

The mandrel 114 is of particularly effective utility in that it serves to guide the workpieces as they approach the recess 132, it insures that the fitting F will be fully pressed onto the tube T, and it insures that no melt from the shoulders R, $R^1$ of the workpieces will block the bores $b$ or $b^1$ of the workpieces.

The control arm 52 provides an effective means of locating the tube within the clamp, and the abutment arm 66 adapts the machine to handle fittings of different length.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Apparatus for spin welding thermoplastic workpieces together comprising:
    securing means for holding one thermoplastic workpiece, with another thermoplastic workpiece mounted on said one workpiece;
    gripping means having radially openable and closable jaws forming a recess in which said other workpiece can be positioned;
    said recess, in the opened condition of said jaws, being of sufficient radial and axial size to prevent any axial or radial contact between said gripping means and said other workpiece when the latter is positioned therein;
    means continuously rotating said jaws in both the opened and closed positions of said jaws; and
    power means operable independently of contact between said gripping means and said other workpiece for radially closing said rotating jaws rapidly into radial contact with said other workpiece to rotate said other workpiece substantially instantaneously at the speed of said gripping means and relative to said one workpiece to frictionally melt the interface between said workpieces, and for subsequently releasing said other workpiece from said gripping means.

2. Apparatus according to claim 1 wherein said jaws rotate about a horizontal axis.

3. Apparatus according to claim 1 wherein said gripping means comprises a collet reciprocably mounted within a head, said collet including said jaws; which are radially flexible; said power means comprising means for reciprocating said collet relative to said head so that contact between surfaces on said jaws and head flexes said jaws radially inwardly.

4. Apparatus according to claim 1 including a mandrel mounted on said gripping means and projecting through and outwardly beyond said recess, said mandrel being receivable within a bore of said other workpiece to guide the latter into said recess and being of a length to extend beyond said radial shoulders to prevent melt from said shoulders from blocking said bore.

5. Apparatus according to claim 4 wherein said mandrel is freely rotatably mounted relative to said rotating collet.

6. Apparatus according to claim 4 wherein said mandrel is axially displaceable by engagement of a lip thereof with said other workpiece, and means for yieldably resisting such axial displacement to insure that said radial shoulders on said workpieces abut.

7. Apparatus according to claim 6 wherein said yieldable resisting means comprises a spring.

8. Apparatus according to claim 1 wherein said securing means comprises a reciprocable non-rotatable clamp means, and power means for reciprocating said clamp means relative to said gripping means.

9. Apparatus according to claim 8 wherein said clamp means includes a rotatable lever spaced from a clamping recess of said clamp means for serving as a stop for said one workpiece to position said one workpiece in said clamp.

10. Apparatus according to claim 8 wherein said power means for closing said jaws comprises a power unit connected to said gripping means, switch means for actuating said power unit; said clamp means including an adjustable arm for actuating said switch means when said clamp means is shifted toward said gripping means.

11. Apparatus according to claim 8 wherein said clamp means comprises a carriage, a pair of movable clamp elements on said carriage, and power means carried by said carriage for opening and closing said clamp elements.

12. Apparatus according to claim 11 wherein said carriage carries a switch for activating said last named power means, and a movable lever for actuating said last named switch means.

13. Apparatus for spin welding a thermoplastic socketed fitting to a thermoplastic tube so that bores in said tube and fitting are aligned, said fitting and tube including abutable radial shoulders surrounding said bores, said apparatus comprising:
a non-rotatable clamp for securing said tube against rotation, with said fitting being mounted by friction fit on a forward end of said tube;
a continuously rotating collet having radially closable jaws which define a recess;
an axially movable mandrel extending beyond said recess toward said clamp;
means for converging said clamp and said collet so that said mandrel loosely enters the bore of said fitting and said fitting enters said recess;
said mandrel having a lip for engagement by said fitting so that said mandrel is urged inwardly;
yieldable means resisting axial movement of said mandrel to insure that said radial shoulder of said tube abuts said radial shoulder of said fitting, and
power means for suddenly closing said jaws radially into engagement with an outer wall of said fitting to substantially instantly rotate said fitting at the speed of said collet relative to said tube to melt the interface therebetween, and for subsequently releasing said fitting from said jaws.

14. Apparatus according to claim 13 wherein said collet rotates about a horizontal axis.

15. Apparatus according to claim 13 wherein said collet is reciprocably mounted within a head, said power means comprising means for reciprocating said collet inwardly relative to said head so that contact between surfaces on said jaws and head forces said jaws radially inwardly.

16. Apparatus according to claim 13 wherein said mandrel is of a length to extend beyond the radial shoulders of said tube and fitting to prevent melt from such shoulders from blocking the bores of the tube and fitting.

17. Apparatus according to claim 13 wherein said mandrel is freely rotatably mounted relative to said collet.

18. Apparatus according to claim 13 wherein said clamp is reciprocable, and power means are mounted to said clamp for reciprocating said clamp relative to said collet.

19. Apparatus according to claim 13 wherein said clamp includes a rotatable lever spaced from a clamping recess of said clamp to serve as a stop for said tube to position said tube at a selected distance from said gripping means.

20. Apparatus according to claim 13 wherein said clamp comprises a carriage, a pair of movable clamp elements on said carriage, and power means carried by said carriage for opening and closing said clamp elements.

21. Apparatus according to claim 13 wherein said power means for closing said jaws comprises a power unit connected to said collet, switch means for actuating said power unit; said clamp including an adjustable arm for actuating said switch means when said clamp is shifted toward said collet.

22. Apparatus for spin-welding a pair of thermoplastic workpieces, a first of said workpieces having a socket for receiving a second of said workpieces so that bores of said workpieces are aligned, said first workpiece having a radial shoulder for contacting a radial shoulder of said second workpiece said shoulders surrounding said bores, said apparatus comprising:
a horizontally reciprocable carriage, said carriage carrying:
a pair of movable clamp elements for receiving said second workpiece and fixing the latter against rotation,
power means for opening and closing said clamp elements,
power means for reciprocating said carriage, with said second workpiece positioned by friction fit in the socket of said first workpiece;
a spinner assembly comprising:
a reciprocable collet having radially flexible jaws defining a recess,
a head mounted around said collet and having an inclined surface,
means for continuously rotating said collet;
a mandrel mounted within said collet so as to be axially movable and rotatable relative thereto, said mandrel extending co-axially relative to said collet and projecting through and beyond said recess to be loosely received within a bore of said first workpiece when said clamping means is advanced toward said spinner assembly;

said mandrel having a lip to be engaged by said first workpiece;

a yieldable spring for resisting axial movement of said mandrel to bring said radial shoulders of said workpieces into abutting relation;

means for reciprocating said collet relative to said head to bring said inclined surface into contact with said jaws and flex the latter radially inwardly against said first workpiece so that said first workpiece spins with said collet relative to said second workpiece to melt the interface between said workpieces.

23. A method of spin welding thermoplastic workpieces comprising the steps of:

rotating a gripping member having radially closable jaws, positioning between said jaws a first workpiece mounted upon a second workpiece, subsequent to said rotating and positioning steps, closing said rotating jaws radially into gripping contact with said first workpiece to spin said first workpiece relative to said second workpiece, to melt the interface between said workpieces, and subsequently releasing said jaws from said first workpiece while said jaws continue to rotate.

24. A method according to claim 23 wherein said positioning step comprises positioning within a bore of said first workpiece a mandrel which projects from said gripping member and extends axially beyond said jaws.

25. A method for spin welding a thermoplastic socketed fitting to a thermoplastic tube so that said tube is secured within the socket of said fitting with longitudinal and radial surfaces of said fitting and tube being bonded together and with bores of said fitting and tube being aligned, said method comprising the steps of:

continuously rotating a collet, said collet including radially closable jaws forming a recess;

securing said tube to a non-rotatable clamp;

with said fitting mounted on said tube, converging said clamp and collet so that an axially movable mandrel extending beyond said recess loosely enters the bore of said fitting and said fitting enters said recess and engages a lip of said mandrel;

yieldably resisting axial movement of said mandrel so that said radial shoulders of said tube and fitting abut, subsequent to entry of said fitting into said recess, closing said jaws radially against said fitting to spin said fitting substantially instantly at the speed of said collet and relative to said tube to melt the interface therebetween; and subsequently releasing said fitting from said jaws.

26. A method according to claim 25 wherein said jaws rotate relative to said mandrel, and said mandrel enters said bore and extends axially beyond the juncture of said radial shoulders to prevent melt from said shoulders from closing said bore.

27. Apparatus for spin welding thermoplastic workpieces comprising:

securing means for holding one thermoplastic workpiece, with another thermoplastic workpiece mounted on said one workpiece;

gripping means having radially closable jaws forming a recess in which said other workpiece can be located;

a mandrel mounted on said gripping means and projecting through and outwardly beyond said recess, said mandrel being receivable within a bore of said other workpiece to guide the latter into said recess and being of a length to extend beyond said radial shoulders to prevent melt from said shoulders from blocking said bore;

means for continuously rotating said jaws; and power means for radially closing said rotating jaws rapidly into radial contact with said other workpiece to rotate said other workpiece substantially instantaneously at the speed of said gripping means and relative to said one workpiece to frictionally melt the interface between said workpieces, and for subsequently releasing said other workpiece from said gripping means.

28. Apparatus for spin welding thermoplastic workpieces together comprising:

a reciprocable nonrotatable clamp for holding one thermoplastic workpiece, with another thermoplastic workpiece mounted on said one workpiece;

said clamp including a movable arm spaced from said clamping recess for serving as a stop for said one workpiece to position the latter in said clamp;

gripping means having radially closable jaws forming a recess in which said other workpiece can be located;

first power means for reciprocating said clamp relative to said gripping means to position said other workpiece in said recess;

means for continuously rotating said jaws; and second power means for radially closing said rotating jaws rapidly into radial contact with said other workpiece to rotate said other workpiece substantially instantaneously at the speed of said gripping means and relative to said one workpiece to frictionally melt the interface between said workpieces, and for subsequently releasing said other workpiece from said gripping means.

29. Apparatus for spin welding thermoplastic workpieces together comprising:

a reciprocable nonrotatable clamp for holding one thermoplastic workpiece, with another thermoplastic workpiece mounted on said one workpiece;

gripping means having radially closable jaws forming a recess in which said other workpiece can be located;

first power means for reciprocating said clamp relative to said gripping means to position said other workpiece in said recess;

means for continuously rotating said jaws; second power means for radially closing said rotating jaws rapidly into radial contact with said other workpiece to rotate said other workpiece substantially instantaneously at the speed of said gripping means and relative to said one workpiece to frictionally melt the interface between said workpieces, and for subsequently releasing said other workpiece from said gripping means, said second power means comprising:

a power unit connected to said gripping means, and switch means for actuating said power unit, and an arm mounted for movement with said clamp for actuating said switch means when said clamp is shifted toward said gripping means.

30. Apparatus for spin welding thermoplastic workpieces together comprising:

a reciprocable nonrotatable clamp for holding one thermoplastic workpiece, with another thermoplastic workpiece mounted on said one workpiece;

said clamp comprising a carriage, a pair of movable clamp elements on said carriage, and first power means carried by said carriage for opening and closing said clamp elements;

gripping means having radially closable jaws forming a recess in which said other workpiece can be located;

first power means for reciprocating said clamp relative to said gripping means to position said other workpiece in said recess;

means for continuously rotating said jaws; and second power means for radially closing said rotating jaws rapidly into radial contact with said other workpiece to rotate said other workpiece substantially instantaneously at the speed of said gripping means and relative to said one workpiece to frictionally melt the interface between said workpieces, and for subsequently releasing said other workpiece from said gripping means.

* * * * *